United States Patent [19]

Browning

[11] 4,093,694

[45] June 6, 1978

[54] METHOD OF MAKING A RUBBER ARTICLE HAVING A PERMANENT MARKING HEREIN

[75] Inventor: Vernon D. Browning, Waynesville, N.C.

[73] Assignee: Dayco Corporation, Dayton, Ohio

[21] Appl. No.: 711,922

[22] Filed: Aug. 5, 1976

Related U.S. Application Data

[62] Division of Ser. No. 559,280, Mar. 17, 1975, abandoned.

[51] Int. Cl.² .......................... B29D 3/00; B29H 3/06
[52] U.S. Cl. ................................. 264/246; 264/255; 264/259; 264/266; 264/296
[58] Field of Search .............. 264/245, 246, 255, 132, 264/135, 293, 296, 271, 279, 275, 129, 134; 156/116, 218, 230, 233, 234, 237, 239, 240; 427/256, 259, 264, 270, 271, 272, 275, 147, 148

[56] References Cited

U.S. PATENT DOCUMENTS

| | | | |
|---|---|---|---|
| 1,818,575 | 8/1931 | Parrett | 427/264 |
| 2,139,068 | 12/1938 | Bourdon | 428/207 |
| 2,236,171 | 3/1941 | Garretson | 264/248 |
| 2,706,833 | 4/1955 | Doherty | 156/303.1 |
| 3,441,635 | 4/1969 | Oshima | 264/245 |
| 3,580,772 | 5/1971 | Ochoa | 156/240 |
| 3,802,947 | 4/1974 | McQuade | 156/240 |
| 3,926,707 | 12/1975 | Glaser et al. | 156/240 |

FOREIGN PATENT DOCUMENTS

396,866  5/1941  Canada.

*Primary Examiner*—Willard E. Hoag
*Attorney, Agent, or Firm*—Reuben Wolk

[57] ABSTRACT

A method of permanently marking a rubber product is provided wherein the rubber product has a debossed marking of a particular color in a portion thereof and a layer of rubber is defined as an integral part of the rubber product and surrounds the marking with such layer of rubber having a color which is different than and contrasts the particular color.

12 Claims, 3 Drawing Figures

4,093,694

METHOD OF MAKING A RUBBER ARTICLE HAVING A PERMANENT MARKING HEREIN

This is a division of Ser. No. 559,280 filed Mar. 17, 1975 and now abandoned.

BACKGROUND OF THE INVENTION

It is well known that elastomeric products such as endless power transmission belts, belt conveyors, hose constructions, printing blankets, textile cots, and similar products which are made primarily of elastomeric materials and particularly elastomeric materials in the form of either natural or synthetic rubbers are often used under severe operating conditions whereby markings provided thereon are often obliterated making it difficult to identify the rubber product for replacement and other purposes. These elastomeric products are often marked after the products have been cured thereby requiring additional labor and equipment to mark such products for identification purposes, or the like, whereby the costs of such products are increased substantially.

SUMMARY

This invention provides an improved method of marking a rubber product of the character mentioned and a rubber product having such permanent marking thereon wherein the method enables marking of the product during curing thereof eliminating the need for post cure marking operations while providing a permanent distinct marking for the rubber product which is capable of being used under severe conditions without obliteration thereof. The method comprises the steps of embossing a member to produce a mirror image raised marking above a surface of the member, coating the raised marking with a marking liquid having one color, applying a layer of uncured rubber having another color over the surface of the coated raised marking, holding the member with its coated raised marking embedded within an uncured rubber product, subjecting the uncured rubber product with the member held thereagainst to a curing environment to simultaneously cure the uncured product and rubber layer, and removing the member leaving the rubber product with a debossed correctly reading marking therein.

Other details, uses, and advantages of this invention will be readily apparent from the exemplary embodiments thereof presented in the following specification, claims, and drawing.

DESCRIPTION OF THE DRAWING

The accompanying drawing shows present exemplary embodiments of this invention, in which.

DETAILED DESCRIPTION

Figure 1:
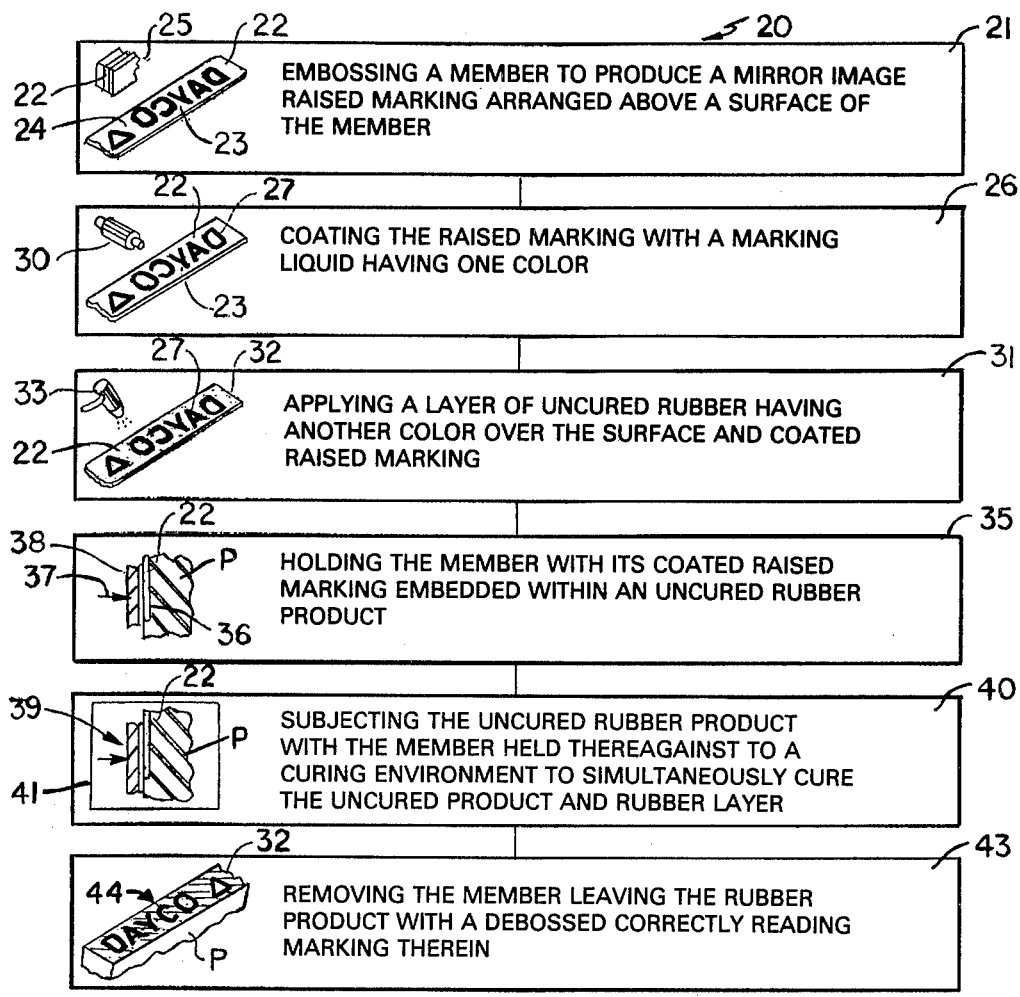
FIG. 1 is a block presentation together with fragmentary drawings in eac block of typical steps comprising the method of this invention which may be utilized to provide a rubber product having a debossed permanent marking therein.

Reference is now made to FIG. 1 of the drawing which presents steps comprising the method of this invention, in a series of rectangular blocks, together with fragmentary showings in each block to highlight each method step; and, the method of this invention is designated generally by the reference numeral 20.

The method comprises an embossing step as illustrated in the block designated by the reference numeral 21 wherein a member 22 is embossed to produce a mirror image raised marking 23 which is arranged above a surface 24 of the member. The member 22 may be any suitable member made in the form of a massive structure, strip, or the like, and made of either a metallic or non-metallic material; however, in this example, the member 22 is in the form of an aluminous strip and the embossment therein is such that it extends through the entire thickness of the member. The embossing action is provided by a pair of cooperating male and female die means 25.

The method 20 includes a coating step as illustrated by the block 26 wherein the raised marking 23 is coated with a marking liquid which may have any desired particular color and for simplicity the coating is shown in this example as a coating or a marking liquid in the form of black ink 27. The coating action may be achieved using any suitable technique known in the art whereby such coating action may be achieved utilizing a coating roller 30 whereby only the raised marking is coated. The coating roller may be suitably saturated with the marking liquid or ink 27 using any known means.

The method 20 comprises an applying step illustrated in the block 31 wherein a layer 32 of uncured rubber having another color is applied over the surface 22 and over the raised marking 23 with its ink coating 27 thereon. The layer of uncured rubber is represented by a plurality of dotted lines extending across the member 22 in parallel sets. The layer of uncured rubber may be applied using any suitable technique known in the art, such as a spray nozzle 33, for example. The ink coating 27 may be any suitable color and the rubber layer 32 may be of any suitable color; however, the color of layer 32 preferably is in contrast to the color of the ink coating 27.

The method 20 comprises a holding step as indicated by the block 35 wherein the member 22 with its coated raised marking is held embedded as shown at 36 within an uncured rubber product with such rubber product being designated by the reference letter P. The holding action may be achieved utilizing any suitable holding mechanism or holding means and a typical holding means is illustrated schematically by an arrow 37 and backup member 38 in the block 35.

The method 20 comprises a subjecting step indicated by the block 40 wherein the uncured rubber product P with the member 22 held thereagainst as shown at 39 is subjected to a curing environment which simultaneously cures the uncured rubber product P and the rubber layer 32. A schematic showing of a curing environment is shown in the block 40 as a rectangle 41 and such curing environment may be a curing chamber of any suitable type known in the art. For example, a steam chamber may be employed which uses steam at a controlled temperature and pressure to provide curing of the rubber product P and the rubber layer 32 in a simultaneous manner to thereby define the layer 32 as an integral part of the product P.

The method 20 also comprises a removing step as indicated by the block 43 and the removing step comprises the step of removing the member 22 and leaving the rubber product P with a debossed correctly reading permanent marking therein as shown at 44 in the upper left-hand corner of the block 43. The marking shown is the name and a symbol used by the inventor's assignee corporation. With the member 22 removed the debossed correctly reading marking which appears is in color contrast with the adjoining outer layer 32 which now, in essence, is defined as an unseparable unitary part of the product P.

As mentioned earlier, any suitable color may be employed for the marking liquid and any suitable color may be used for the layer 32. Excellent results have been obtained using a marking liquid in the form of black ink with the layer 32 being a yellow layer.

Figure 2:
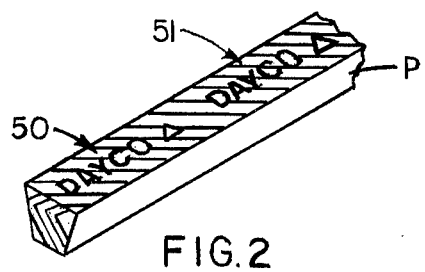
FIG. 2 is a fragmentary view with parts in cross section particularly illustrating a rubber product in the form of an exemplary endless power transmission belt having a repeating debossed permanent marking of this invention provided therein.

Reference is now made of FIG. 2 of the drawing wherein a rubber product in the form of an endless power transmission belt which is also designated generally by the reference letter P is provided and has a debossed permanent marking therein made in accordance with the method 20 of this invention and the same marking shown in FIG. 1 is illustrated. The endless power transmission belt of FIG. 2 has a debossed marking in the form of a repeating marking which appears at a plurality of locations along the product as indicated at 50 and 51, for example. The marking is provided in the top portion of what is normally referred to as the tension section of the belt P.

Figure 3:
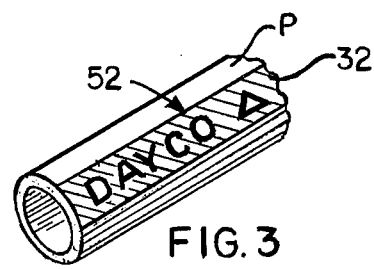
FIG. 3 is a fragmentary view with parts in cross section particularly illustrating a rubber product in the form of a hose construction having debossed permanent marking of this invention provided therein.

Another exemplary rubber product having a debossed permanent marking therein made in accordance with this invention is illustrated in FIG. 3 and is in the form of a hose construction which is also designated generally by the reference letter P. The hose construction of FIG. 3 also has the marking illustrated in FIG. 1 provided therein and such marking may be a repeating marking provided within a layer 32 extending along the length of the hose construction as illustrated at 52 or the marking may extend circumferentially around such hose construction.

In this disclosure of the invention reference has been made to the fact that the marking liquid may be any suitable marking liquid; and it will be appreciated that marking ink may be used for this purpose and such marking ink may be either an oil-based ink or a rubber-based ink.

Only two specific products in the form of the endless power transmission belt P of FIG. 2 and the hose construction P of FIG. 3 have been illustrated and described in this disclosure; however, it will be appreciated that the method of this invention may be utilized to mark any rubber product including the rubber products mentioned in the background of the invention presented in this specification.

The words emboss and deboss and their derivatives and their various tenses have been used throughout this disclosure; and, it is to be understood that the definition of each of these words is the commonly accepted dictionary definition thereof. For example, an embossed marking is a marking raised above a particular surface. A debossed marking is a marking which is depressed below the surrounding surface; and, it will be appreciated that with a debossed marking the marking ink or material is in a protected position.

While present exemplary embodiments of this invention, and methods of practicing the same, have been illustrated and described, it will be recognized that this invention may be otherwise variously embodied and practiced within the scope of the following claims.

What is claimed is:

1. A method of permanently marking a rubber article comprising the steps of, embossing a member to produce a mirror image raised marking arranged above a surface of said member, coating said raised marking with a layer of marking material having one color, applying a layer of uncured rubber having another color over said surface and layer of raised marking material, embedding said member with its layer of raised marking material within an uncured rubber article and holding said member therein, subjecting said uncured rubber article with said member held therein to a curing environment to simultaneously cure said uncured article while curing said layer of uncured rubber as an integral outer part of said rubber article and removing said member member leaving said rubber article with a unitary two-layer debossed correctly reading marking therein defined by said layer of marking material and rubber, said two layers helping to assure the permanence of said marking.

2. A method as set forth in claim 1 in which said applying step comprises applying said layer of rubber having said other color which contrasts said one color.

3. A method as set forth in claim 1 in which said coating stem comprises coating said raised marking with a marking liquid in the form an an oil-based ink.

4. A method as set forth in claim 1 in which said coating step comprises coating said raised marking with a marking liquid in the form of a rubber-based ink.

5. A method as set forth in claim 1 in which said subjecting step comprises subjecting said article with said member held therein in to a curing environment in the form of an environment controlled in temperature and pressure.

6. A method as set forth in claim 1 in which said coating step comprises coating said raised marking with a marking liquid using a coating roller.

7. A method as set forth in claim 1 in which said applying step comprises applying said layer of uncured rubber with a spray nozzle.

8. The method of claim 1 wherein said article is an endless power transmission belt.

9. The method of claim 1 wherein said article is a hose.

10. A method as set forth in claim 1 in which said embossing step comprises embossing said member which is in the form of a strip.

11. A method as set forth in claim 10 in which said embossing step comprises embossing a strip of an aluminous material throughout the entire thickness thereof.

12. A method as set forth in claim 10 in which said embossing step comprises embossing said strip with cooperating die means.

* * * * *

UNITED STATES PATENT OFFICE
CERTIFICATE OF CORRECTION

Patent No. 4,093,694          Dated June 6, 1978

Inventor(s) Vernon D. Browning

It is certified that error appears in the above-identified patent and that said Letters Patent are hereby corrected as shown below:

First page of patent, third line of title, "HEREIN" should be -- THEREIN --.

Colum 4, line 34, "stem" should be -- step -- .

Signed and Sealed this

Seventh Day of November 1978

[SEAL]

Attest:

RUTH C. MASON
Attesting Officer

DONALD W. BANNER
Commissioner of Patents and Trademarks